UNITED STATES PATENT OFFICE.

ALBERT RUDOLPH OSCAR PIEPER, OF HAMBURG, GERMANY.

PROCESS OF MAKING CITRATE SOLUBLE PHOSPHATES.

SPECIFICATION forming part of Letters Patent No. 535,076, dated March 5, 1895.

Application filed April 25, 1894. Serial No. 509,010. (No specimens.)

*To all whom it may concern:*

Be it known that I, ALBERT RUDOLPH OSCAR PIEPER, a subject of the German Emperor, and a resident of Hamburg, in the German Empire, have invented certain new and useful Improvements in and Relating to the Manufacture of Artificial Manure, of which the following is a specification.

This invention relates to the manufacture of artificial fertilizers containing phosphoric acid soluble in citrate from iron or aluminum phosphate by the aid of lime and small quantities of a potash or soda lye. It has already been suggested to treat phosphates, by first warming the same in a potash lye and precipitating the phosphoric acid from the liquid by the aid of lime, after the residue has been separated. The precipitated phosphate of calcium then forms the insoluble tricalcic phosphate, which still contains large quantities of carbonate of lime, and is therefore in this state unfit for use as a fertilizer, and has therefore been treated with sulfuric acid, so as to adapt it for use as a fertilizer.

According to my invention I am enabled to produce a fertilizer that is adapted for immediate use by treating phosphates with potash or soda lyes and lime in the following manner.

The novel and characteristic features of my process consist in treating the phosphate simultaneously with an alkali lye and lime, (in lieu of employing these reagents successively) in such relative proportions that there will be two equivalents of oxid of lime for each equivalent of the phosphoric acid of the phosphate to be treated. The burnt lime, weighed out in proper quantity is slaked in from five to ten per cent. of an alkali lye, either soda or potash lye, so that a thick pulp will result. To this pulp, while still hot, I add the finely ground iron or aluminum phosphate, the compound being energetically stirred during mixture, so that a thoroughly homogeneous mass is obtained. In the ensuing reaction, which takes place under evolution of considerable heat, the phosphate is converted into an alkali phosphate under the action of the alkali, the phosphate being, however, decomposed in its nascent state by the lime into phosphoric acid soluble in citrate, while the alkali is set free and ready to act again. The pulpy mass thus obtained is then dried in any suitable manner, and may at once be used as a fertilizer, to which I preferably add a nitrate, as saltpeter. The product contains bibasic phosphate of lime in combination with potash or soda. The phosphoric acid is completely soluble in citrate of ammonia, and is therefore readily assimilated by plants, and is for fertilizing purposes substantially equivalent to phosphoric acid soluble in water. The fertilizer thus obtained, is ready for use without further treatment, and, if saltpeter is added thereto contains the three most valuable nutriments for plants, viz., phosphoric acid, potash, and nitrogen, in a readily soluble or assimilable form.

The nature of the potash in the final product will depend upon the nitrate added. If potassium nitrate is used in the process as described, the potash will be obtained in the form of a nitrate, but if the phosphoric acid is decomposed by means of potassium carbonate in a lime pulp and Chile saltpeter, *i. e.*, sodium nitrate is added, then the potash will be obtained in the final product in the form of a phosphate.

Having thus described my invention, what I claim as new therein, and desire to secure by Letters Patent, is—

1. The herein-described process, which consists in mixing finely divided phosphate of iron or aluminum with a pulp obtained by slaking caustic lime in an alkali lye in such proportions that there will be about two equivalents of oxid of lime for each equivalent of phosphoric acid in the compound.

2. The herein-described process, which consists in mixing finely divided phosphate of iron or aluminum with a hot pulp obtained by slaking caustic lime in a soda or potash lye in such proportions that there will be about two equivalents of oxid of lime for each equivalent of phosphoric acid in the compound.

3. The herein-described process, which consists in forming a pulp by slaking quick lime in a soda or potash lye, mixing with said pulp iron or aluminum phosphate and a nitrate, whereby the phosphate is converted into phosphoric acid soluble in citrate and a fertilizer obtained ready for use without further treatment.

In testimony that I claim the foregoing as my invention I have signed my name, in presence of two witnesses, this 12th day of April, 1894.

ALBERT RUDOLPH OSCAR PIEPER.

Witnesses:
DIEDRICH PETERSEN,
THEODOR MÜLLER.